United States Patent
Kobayashi et al.

(10) Patent No.: US 6,243,205 B1
(45) Date of Patent: Jun. 5, 2001

(54) DEVICE FOR DRIVING AN EC DIMMING MIRROR

(75) Inventors: Akiyoshi Kobayashi, Hamamatsu; Mitsuyoshi Nagao, Fujieda, both of (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 09/450,454

(22) Filed: Nov. 29, 1999

(30) Foreign Application Priority Data

Feb. 2, 1999 (JP) .................................................. 11-024476

(51) Int. Cl.⁷ .................................................... G02B 27/00
(52) U.S. Cl. ......................... 359/603; 359/601; 359/604; 359/265; 359/267
(58) Field of Search ..................................... 359/603, 601, 359/604, 265, 267, 884; 250/214 AL

(56) References Cited

U.S. PATENT DOCUMENTS 5,486,952 * 1/1996 Nagao et al. ........................ 359/603

* cited by examiner

*Primary Examiner*—Mohammad Sikder
(74) *Attorney, Agent, or Firm*—Hedman & Costigan

(57) ABSTRACT

In a device for diving an EC dimming mirror, an oscillation circuit generates pulse signals which change in the duty factor in accordance with quantity of surrounding light and quantity of rear light. An integration circuit integrates these pulse signals and outputs DC voltage corresponding to the duty factor. The DC voltage produced by the integration circuit is subjected to a processing for shifting a sensitivity curve in parallel by a voltage operation circuit, is limited in upper and lower limit values by a voltage limiting circuit and then is applied to an EC element through a drive circuit (28) to control the amount of coloration of the EC element.

5 Claims, 5 Drawing Sheets

DEVICE FOR DRIVING AN EC DIMMING MIRROR

BACKGROUND OF THE INVENTION

This invention relates to a device for driving an EC (electrochromic) automatic dimming mirror (hereinafter simply referred to as "EC dimming mirror" or "dimming mirror") used as an interior or exterior rear view mirror of a vehicle.

An EC dimming mirror is made by disposing an EC element film on the front surface of the reflecting surface of a mirror and achieves a dimming effect against light from headlights of a succeeding vehicle while running at night by changing the amount of coloration of the EC element and thereby controlling reflectivity of the mirror. For obtaining such dimming effect, the dimming mirror is so controlled that, upon detection of quantity of incident light from the rear, the amount of coloration increases (i.e., reflectivity decreases) when the light from the rear is strong whereas the amount of coloration decreases (the color fades, i.e., reflectivity increases) when the light from the rear is weak.

On the other hand, the glare of the light to the human eye is produced by all of the surrounding light and, therefore, the control based on the light from the rear only does not match the human sense. For this reason, a control is generally made in such a manner that not only rear light but also surrounding light is detected and color imparting and color fading controls are made in accordance with quantity of the detected rear and surrounding light. More specifically, when surrounding light is strong, the glare of the light is not so strong notwithstanding that there is rear light. In this case, the sensitivity of detection for the rear light is reduced for making it harder for the EC element to be colored. When the surrounding light is weak, the glare of the light to the rear light is strong and, in this case, sensitivity of detection for the rear light is raised for making it easier for the EC element to be colored.

In the prior art EC dimming mirror, surrounding light and rear light are detected and a value of voltage applied to the EC element is obtained by arithmetic operation in accordance with a combination of the surrounding light and the rear light and the amount of coloration, i.e., reflectivity, is controlled by this voltage. This prior art method, however, requires a structure for combining detected values of the surrounding light and the rear light and obtaining a control amount of a single object of control by arithmetic operation.

For overcoming this problem, the applicant of the present application has proposed, by U.S. Pat. No. 5,486,952 (Japanese Patent Application Laid-open Publication No. Hei 7-281212), a device for driving an EC dimming mirror which enables control of the amount of coloration by controlling the surrounding light and the rear light individually as separate objects of control and thereby realizes a simplified structure of the device.

This device includes oscillation means capable of controlling duration of an "H" level and duration of an "L" level individually and separately. The duration of one level of an oscillation signal produced by the oscillation means is variably controlled in response to surrounding light quantity and the duration of the other level of the oscillation signal is variably controlled in response to rear light quantity. Polarity of drive voltage is switched in accordance with the "H" level and "L" level of the oscillation signal from the oscillation means to pulse drive the EC element and thereby control the amount of coloration of the EC element.

As shown in FIG. 2, the value of drive current for driving an EC element becomes the largest at the moment the polarity of the current is switched from one polarity to the other. For this reason, according to the above described drive method utilizing the pulse voltage, each time the level of the pulse is switched between "H" and "L" (e.g., more than 100 times per minute), current of a large value flows as shown in FIG. 3 and, as a result, the device requires a very large power consumption.

Further, according to the drive system utilizing the pulse voltage, characteristics (sensitivity curve) of a color imparting area and a color fading area as shown in FIG. 4 are provided in response to quantities of surrounding light and rear light. This sensitivity curve can be partly modified as shown by broken lines in FIG. 5 by changing value of resistance in the oscillation circuit. For totally changing the sensitivity curve (i.e., parallel shifting of the curve) as shown in FIG. 6, however, there is no alternative but to change transmittance of a filter provided on the front surface of a light sensor. Thus, total changing of the sensitivity curve by adjustment in the circuit was not possible in the prior art device.

It is, therefore, an object of the invention to provide a device for driving an EC dimming mirror which has overcome the above described problems of the prior art device and is capable of controlling the amount of coloration by controlling duration of pulse, realizing a lower power consumption, and achieving total change of the sensitivity curve by adjustment in the circuit.

SUMMARY OF THE INVENTION

For achieving the object of the invention, a device for driving an EC dimming mirror in which reflectivity is variably controlled by an EC element comprises surrounding light quantity detection means for detecting quantity of light surrounding a vehicle, rear light quantity detection means for detecting quantity of light in the rear of the vehicle, an oscillation circuit for generating an oscillation signal of an "H" level and an oscillation signal of an "L" level repeatedly and alternately, duration of one level of the oscillation signals being variably controlled in response to quantity of light detected by the surrounding light quantity detection means and the other level of the oscillation signals being variably controlled in response to quantity of light detected by the rear light quantity detection means, a DC voltage output circuit for outputting DC voltage in accordance with duty factor of an oscillation output of the oscillation circuit, a drive power source for driving the EC element, and an EC element drive circuit for adjusting polarity and level of drive voltage supplied from the drive power source in response to the level of the output from the DC voltage output circuit, said oscillation circuit performing control, when the one level of the oscillation signals is set to drive the EC element in a color imparting direction and the other level of the oscillation signals is set to drive the EC element in a color fading direction, in such a manner that, when surrounding light quantity is larger, the duration of the one level is shorter and, when the surrounding light quantity is smaller, the duration of the one level is longer and that, when the rear light quantity is larger, the duration of the other level is shorter and, when the rear light quantity is smaller, the duration of the other level is longer, and said oscillation circuit performing control, when the one level of the oscillation signals is set to drive the EC element in a color fading direction and the other level of the oscillation signals is set to drive the EC element in a color imparting direction, in such a manner that, when the surrounding light quantity is larger, the duration of the one level is longer and, when the surrounding light quantity is smaller, the duration of the one level is shorter and that, when the rear light quantity is larger, the duration of the other level is longer and, when the rear light quantity is smaller, the duration of the other level is shorter.

According to the invention, DC voltage is produced in response to the duty factor of the pulse signal for driving the EC element and the EC element is driven in response to this DC voltage and, accordingly, the number of times of switching the polarity of the drive current can be reduced and, moreover, rush current occurring in switching of the polarity can be held at a low value.

Further, by providing a level shift circuit for shifting the level of the output voltage of the DC voltage output circuit and a voltage dividing circuit for dividing the output voltage on the output side of the DC voltage output circuit, the sensitivity curve as a whole can be shifted in parallel or can be changed in its inclination angle whereby total change in the sensitivity curve can be realized in the circuit.

BRIEF DESCRIPTION OF THE DRAWINGS

In the accompanying drawings.

DESCRIPTION OF A PREFERRED EMBODIMENT

Figure 1:
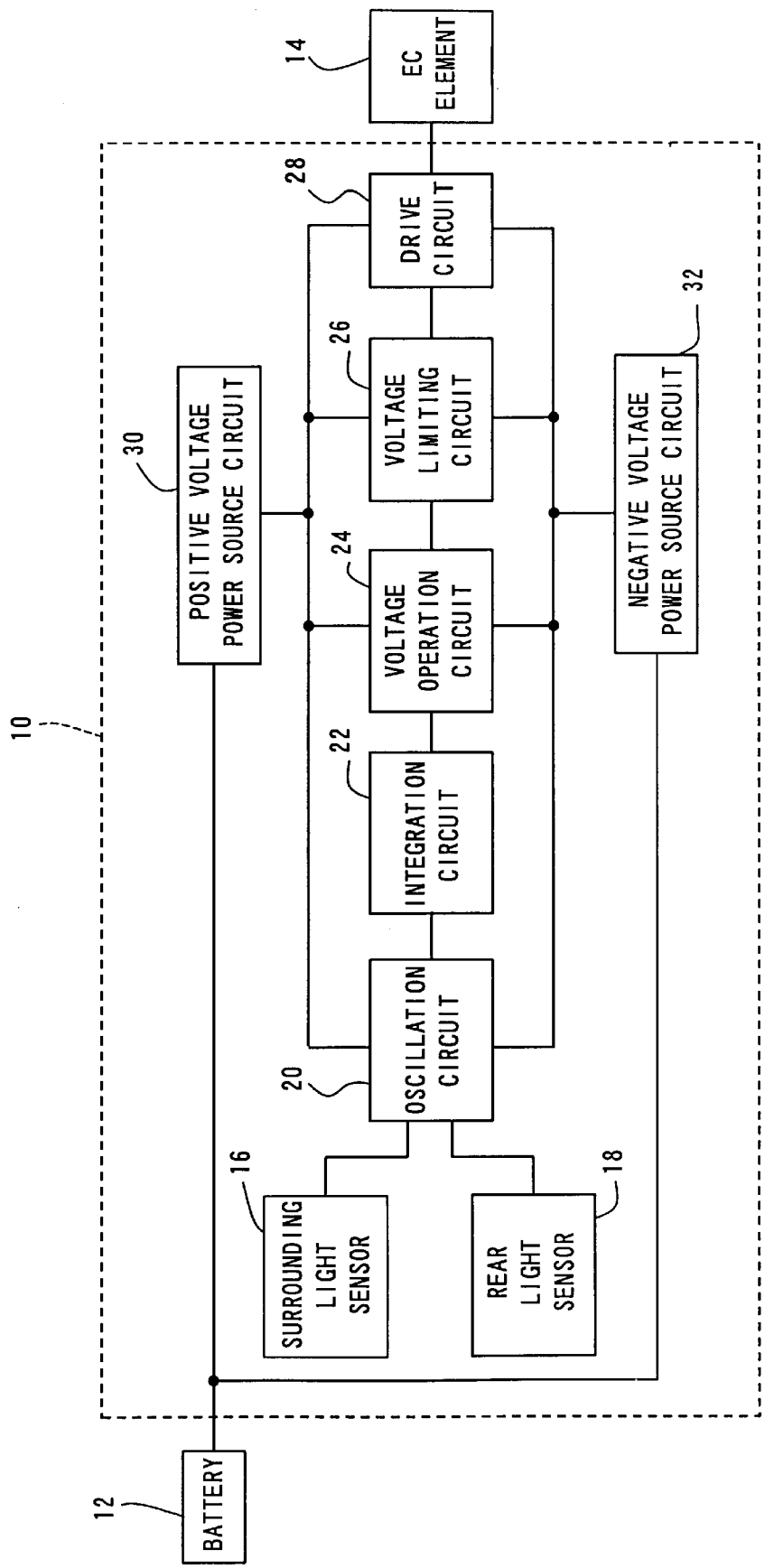
FIG. 1 is a block diagram showing an embodiment of the invention.
Figure 2:
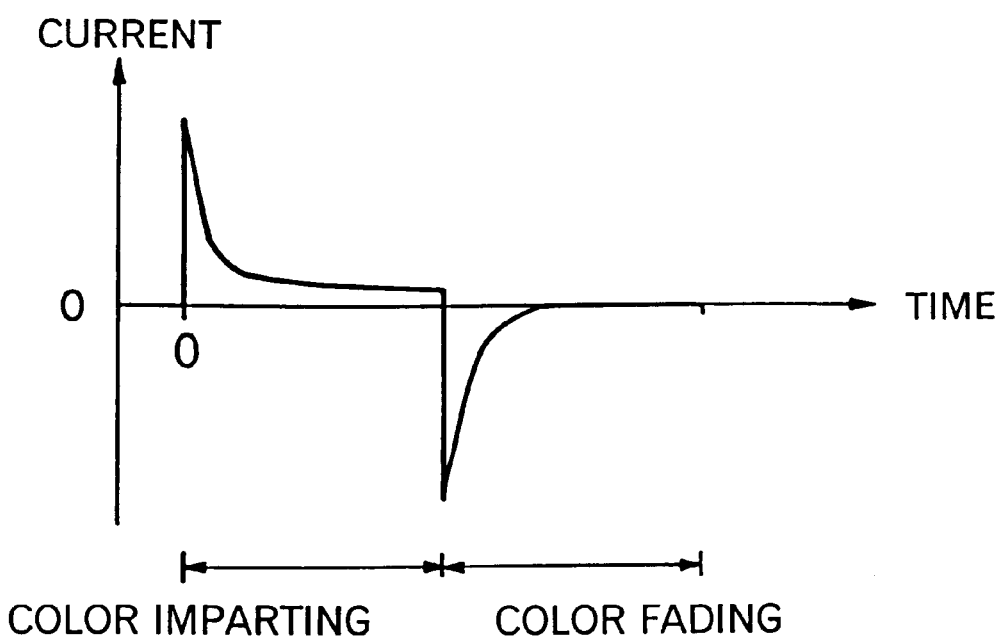
FIG. 2 is a waveform diagram showing a case where an EC element is driven with pulse voltage having positive and negative polarities.
Figure 3:
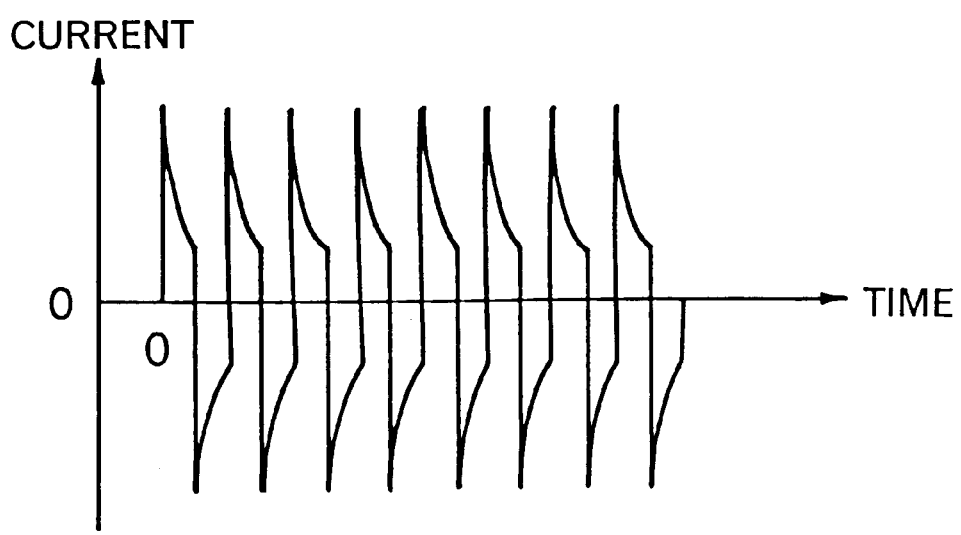
FIG. 3 is a waveform diagram showing drive current for driving the prior art pulse drive type EC dimming mirror.

An embodiment of the present invention is shown in FIG. 1. A device 10 for driving an EC dimming mirror is incorporated in, e.g., a housing of an EC dimming mirror and controls the amount of coloration of an EC element 14 by using a vehicle battery 12 as a power source and thereby variably controls reflectivity of the dimming mirror.

A surrounding light sensor 16 (the surrounding light quantity detection means) detects quantity (i.e., intensity) of light surrounding the vehicle and is disposed in, e.g., a mirror housing of an interior or exterior rear view mirror, facing the front side of the vehicle. A rear light sensor 18 (the rear light quantity detection means) detects quantity (i.e., intensity) of light in the rear of the vehicle and is disposed in, e.g., the mirror housing, facing the rear side of the vehicle.

An oscillation circuit 20 oscillates an oscillation signal of an "H" level and an oscillation signal of an "L" level repeatedly and alternately. Duration of one level of the oscillation signals is variably controlled in response to quantity of light detected by the surrounding light sensor 16. Duration of the other level of the oscillation signals is variably controlled in response to quantity of light detected by the rear light sensor 18. The duty factor of the oscillation signals is thereby variably controlled.

The oscillation circuit 20 controls the duty factor of the oscillation signals as follows. When the one level of the oscillation signals is set to drive the EC element 14 in a color imparting direction and the other level of the oscillation signals is set to drive the EC element 14 in a color fading direction, in such a manner that, when surrounding light quantity is larger, the duration of the one level is shorter and, when the surrounding light quantity is smaller, the duration of the one level is longer and that, when the rear light quantity is larger, the duration of the other level is shorter and, when the rear light quantity is smaller, the duration of the other level is longer. When the one level of the oscillation signals is set to drive the EC element 14 in a color fading direction and the other level of the oscillation signals is set to drive the EC element 14 in a color imparting direction, in such a manner that, when the surrounding light quantity is larger, the duration of the one level is longer and, when the surrounding light quantity is smaller, the duration of the one level is shorter and that, when the rear light quantity is larger, the duration of the other level is longer and, when the rear light quantity is smaller, the duration of the other level is shorter.

By this control, the amount of coloration is continuously controlled. More specifically, when the surrounding light is dim, the sensitivity to the rear light increases and, as the rear light quantity increases, the amount of coloration increases and, as a result, reflectivity decreases and a dimmed state of the dimming mirror thereby is realized. When the surrounding light is bright, the sensitivity to the rear light decreases and the dimming mirror becomes less liable to be colored and reflectivity thereby remains in a high state.

The oscillation signals generated by the oscillation circuit 20 are integrated by an integration circuit 22 (the DC voltage output circuit) and DC voltage is produced by the integration circuit 22 in accordance with the duty factor of the oscillation signals. Time constant of the integration circuit 22 is set to a value which is sufficiently larger than the oscillation period of the oscillation circuit 20 (e.g., 10 msec. or below).

Figure 4:
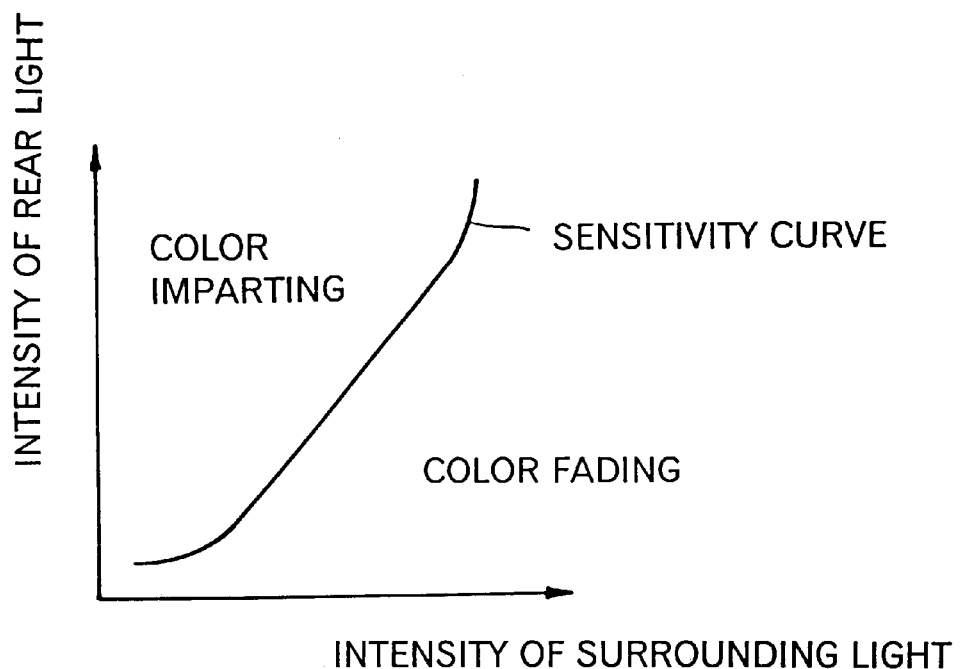
FIG. 4 is a graph showing a sensitivity curve of the prior art pulse drive type EC dimming mirror.
Figure 5:
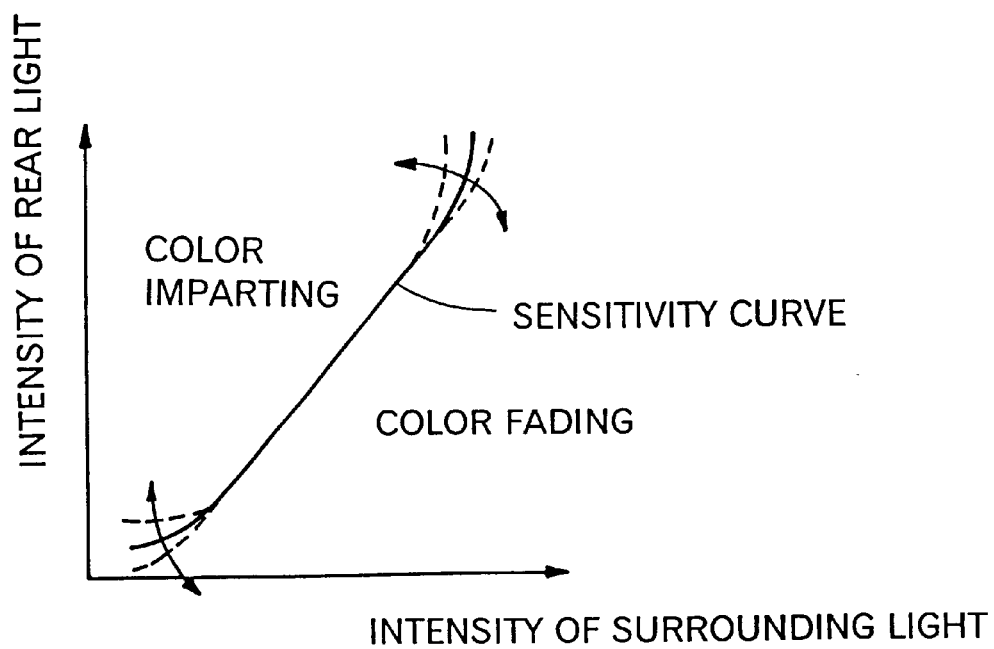
FIG. 5 is a graph showing change in the sensitivity curve in the prior art pulse drive type EC dimming mirror by changing value of resistance in the drive circuit.
Figure 6:
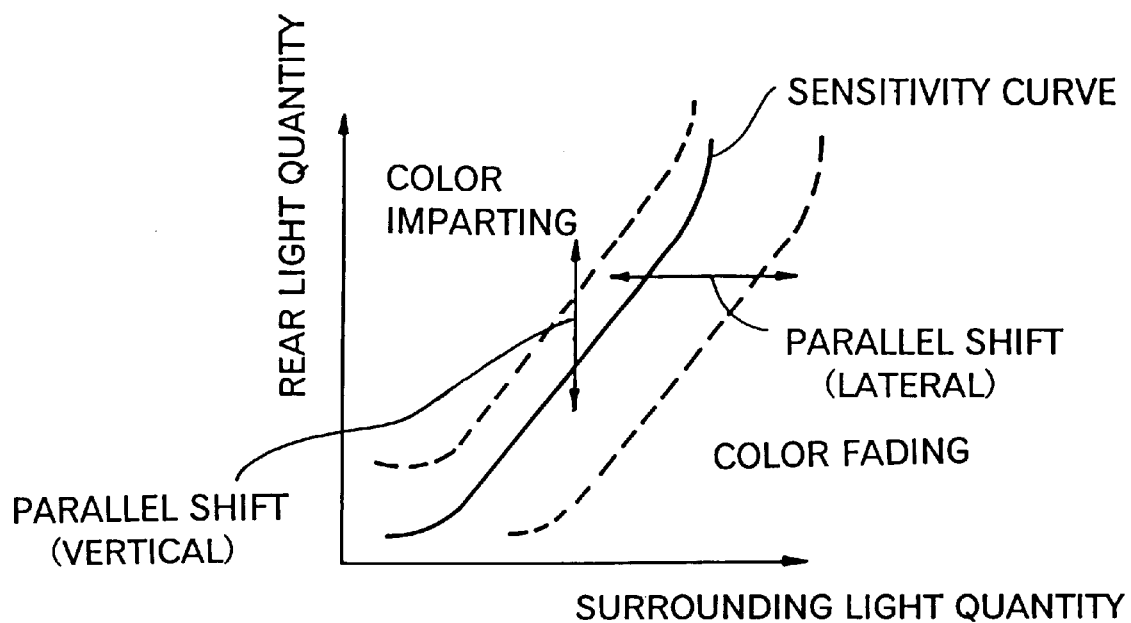
FIG. 6 is a graph showing parallel shifting of the sensitivity curve.

A voltage operation circuit 24 adjusts the output signal of the integration circuit 22 to a signal having desired sensitivity characteristics by applying operation processing including level shifting and voltage dividing. If, for example, the drive device is so set that, when the output signal of the integration circuit 22 is a positive signal, the EC element 14 is driven in a color imparting direction and, when the output signal of the integration circuit 22 is a negative signal, the EC element 14 is driven in a color fading direction, the sensitivity curve in FIG. 4 is shifted downwardly in parallel by adding positive voltage of a certain value to the output signal of the integration circuit 22 and is shifted upwardly in parallel by subtracting this positive voltage from the output signal of the integration circuit 22.

A voltage limiting circuit 26 limits upper and lower limit values of the output voltage of the voltage operation circuit 24 so that the output voltage will not exceed a range of drive voltage (e.g., −1.5V to +1.5V) of the EC element 14. A drive circuit 28 (the EC element drive circuit) adjusts polarity and level of the drive voltage in accordance with the level of the output signal of the voltage limiting circuit 26 and applies the adjusted drive voltage to the EC element 14 to drive the EC element 14. Positive and negative constant voltage power source circuits 30 and 32 (the drive power source) produce positive and negative voltages by using the battery 12 as a drive power source and supply these constant voltages to the respective circuits as power source.

According to the construction of FIG. 1, when the surrounding light is dim, the sensitivity of the EC element 14 to the rear light increases and, as the rear light quantity increases, the amount of coloration increases and reflectivity thereby decreases whereby a dimmed state of the dimming mirror is realized. When the surrounding light is bright, the sensitivity to the rear light decreases and the EC element 14 becomes less liable to be colored and reflectivity thereby remains in a high state.

Since the EC element 14 is driven in response to the signal obtained by integrating the pulse signals produced by the oscillation circuit 20 with the integration circuit 22, frequent switching of the polarity of the drive voltage for the EC element 14 is prevented and rush current occurring in switching of the polarity of the drive voltage is held to a low value whereby power consumption can be held to the minimum. Further, the sensitivity curve as a whole can be shifted in parallel or can be changed in its inclination angle by the voltage operation circuit 24. Furthermore, application of excessive voltage to the EC element 14 can be prevented by the voltage limiting circuit 26.

EXAMPLES

Figure 7:
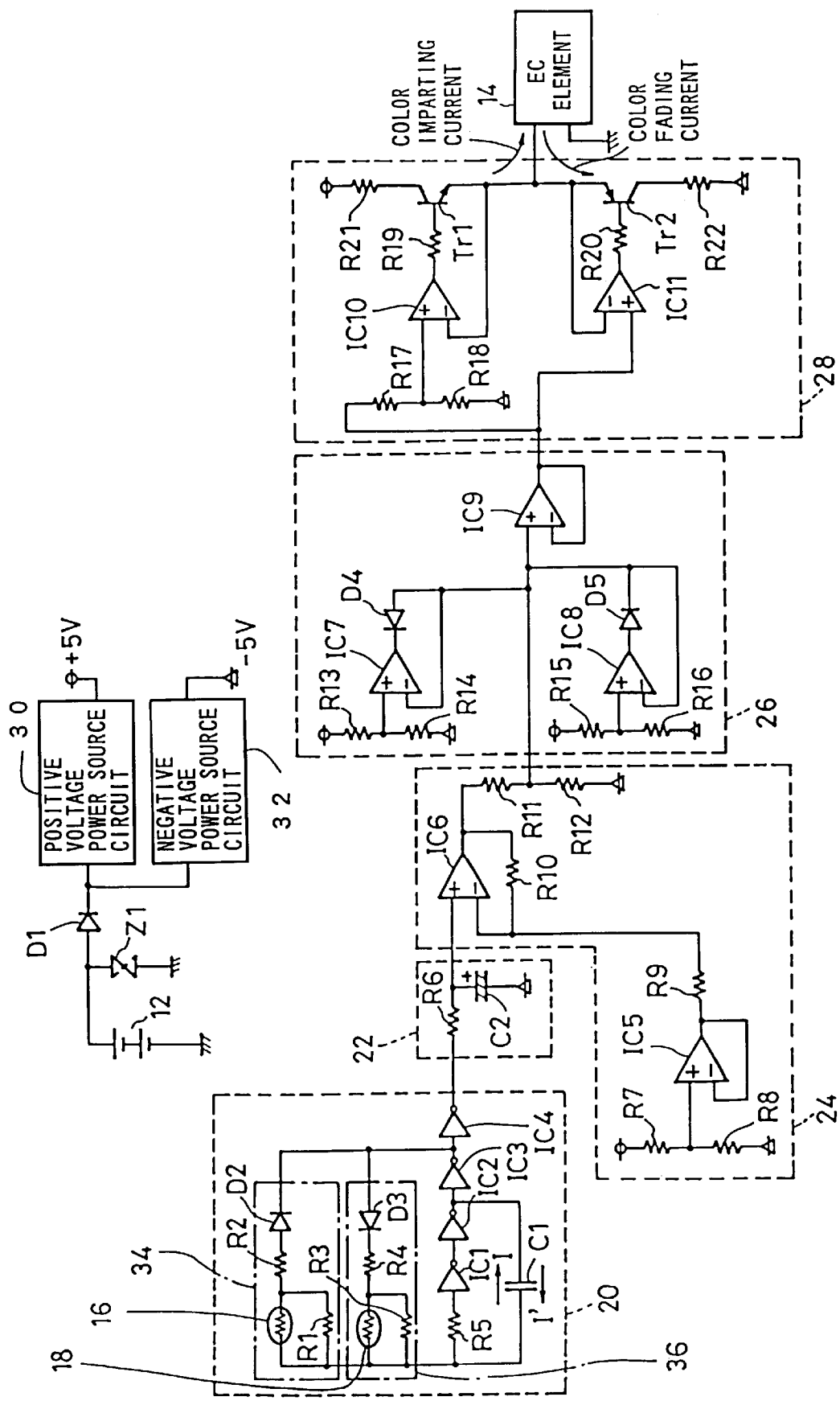
FIG. 7 is a circuit diagram showing a specific circuit of the structure shown in FIG. 1.

An example of a specific circuit of the construction of FIG. 1 is shown in FIG. 7. The positive and negative power source circuits 30 and 32 receive voltage of the battery 12 through a Zener diode Z1 and a diode D1 and generate DC voltage of +5V and −5V and supply these voltages to the respective circuits.

In the oscillation circuit 20, a color imparting side pulse generation section 34 is made of CdS 16 which constitutes the surrounding light sensor, resistance R2 and a diode D2 connected in series to the CdS 16 and resistance R1 connected in parallel to the CdS 16. In the oscillation circuit 20, a color fading side pulse generation section 36 is made of CdS 18, resistance R4 and a diode D3 connected in series to the CdS 18 and resistance R3 connected in parallel to the CdS 18.

The oscillation circuit 20 includes a series circuit of resistance R5 and inverters IC1, IC2, IC3 and IC4. The color imparting side pulse generation section 34 and the color fading side pulse generation section 36 are connected in parallel between the terminals of the series circuit of the resistance R5 and the inverters IC1, IC2 and IC3. A capacitor C1 is connected between the terminals of the series circuit of the resistance R5 and the inverters IC1 and IC2.

Let us assume that the output of the inverter IC3 has been turned from "L" to "H". At this time, the color imparting side pulse generation section 34 is turned off and the color fading side pulse generation section 36 is turned on and current flows through the capacitor C1 in the direction of arrow I. When the capacitor C1 has been charged to a predetermined level, the output of the inverter IC1 is turned from "H" to "L". Thereupon the color fading pulse generation section 36 is turned off and the color imparting pulse generation section 34 is turned on and current flows through the capacitor C1 in the direction of arrow I'. These operations are repeated thereafter and oscillation thereby is continued. The output of the inverter IC3 is inverted by the inverter IC4 and thereafter is delivered out of the oscillation circuit 20.

By the above described operation, duration of "H" level of the oscillation signals provided by the oscillation circuit 20 changes in accordance with the surrounding light quantity (i.e., duration becomes shorter as the surrounding light becomes brighter) and duration of "L" level of the oscillation signals changes in accordance with the rear light quantity (i.e., duration becomes shorter as the rear light becomes brighter).

The output pulse signals from the oscillation circuit 20 are integrated by the integration circuit 22 made of resistance R6 and a capacitor C2 and DC voltage corresponding to the duty factor is produced. In case the period of the pulse signal is 10 msec. or below, time constant of the integration circuit 22 can be set to a value in the order of 2 sec. for example. In this case, the resistance R6 and the capacitor C2 can be set to, e.g., 200 kΩ and 10 μF (200 kΩ×10 μF=2 sec.) respectively.

In the voltage operation circuit 24, a level shift circuit is composed of operational amplifiers IC5 and IC6 and resistances R7, R8, R9 and R10. The resistances R7 and R8 produce reference voltage for shifting. As the reference voltage becomes high, the input signal is delivered out after being shifted down through the operational amplifier IC6 and, as the reference voltage becomes low, the input signal is delivered out after being shifted up. An output signal of the operational amplifier IC6 is divided by a voltage dividing circuit made of resistances R11 and R12 and then is delivered out.

Relation between input voltage Vi and output voltage Vo of the voltage operation circuit 24 is expressed by the following equation:

$$Vo = \left\{ \left(1 + \frac{R10}{R9}\right) Vi - \frac{R10}{R9} \cdot \frac{R8}{R7+R8} \cdot 10 + 5 \right\} \frac{R11}{R11+R12} - 5$$

If R9=R10 in this equation, $$Vo = \left(2Vi - \frac{10R8}{R7+R8} + 5\right) \frac{R11}{R11+R12} - 5$$

In the circuit of FIG. 7, if the output signal of the integration circuit 22 is of a positive polarity, the EC element 14 is driven in the color imparting direction and, if the output signal is of a negative polarity, the EC element 14 is driven in the color fading direction. Accordingly, by increasing the reference voltage by adjusting the resistances R7 and R8 and thereby shifting down the input signal, the sensitivity curve in FIG. 4 is shifted upwardly in parallel and, by decreasing the reference voltage and thereby shifting up the input signal, the sensitivity curve is shifted downwardly in parallel. If the resistance R11 is relatively increased by adjusting the resistances R11 and R12, the output voltage decreases and change in the output voltage to change in the input voltage becomes gradual and the sensitivity curve in FIG. 4 is shifted upwardly. If the resistance R1 is relatively decreased, the output voltage increases and change in the output voltage to change in the input voltage becomes sharp and the sensitivity curve in FIG. 4 is shifted downwardly. Therefore, by adjusting the resistances R7, R8, R9 and R10, the sensitivity curve as a whole can be shifted in parallel in vertical direction or the ratio of change in the output voltage to change in the input voltage can be changed. The locations of the level shift circuit and the voltage dividing circuit may be reversed so that the voltage dividing circuit will be disposed before the level shift circuit.

The voltage limiting circuit 26 sets a positive side limit voltage with an operational amplifier IC7, resistances R13 and R14 and a diode D4 and sets a negative side limit voltage with an operational amplifier IC18, resistances R15 and R16 and a diode D5. If, for example, the range of the drive voltage of the EC element 14 is −1.5V to +1.5V, the + input terminal of the operational amplifier IC7 is set to +1.5V and the + input terminal of the operational amplifier IC8 is set to −1.5V. When the output voltage of the voltage operation circuit 24 tends to exceed +1.5V, the operational amplifier IC7 performs the limiting operation to limit the output voltage to +1.5V. When the output voltage of the voltage operation circuit tends to drop below −1.5V, the operational amplifier IC8 performs the limiting operation to limit the output voltage to −1.5V. The output which has been limited in voltage is delivered out through a buffer amplifier consisting of an operational amplifier IC9.

In the drive circuit 28, a circuit for driving the EC element 14 in the color imparting direction is composed of an operational amplifier IC10, a transistor Tr1 and resistances R19 and R20 and a circuit for driving the EC element 14 in the color fading direction is composed of an operational amplifier IC11, a transistor Tr2 and resistances R20 and R22. When the output voltage of the voltage limiting circuit 26 is rising, the transistor Tr1 is turned on and the transistor Tr2 is turned off to thereby supply color imparting current to the EC element 14. When the output voltage of the voltage limiting circuit 26 is falling, the transistor Tr1 is turned off and the transistor Tr2 is turned on to thereby supply color fading current to the EC element 14. By this arrangement, the terminal voltage of the EC element 14 is always maintained at a value equal to the output voltage of the voltage limiting circuit 26 and thereby is controlled to the amount of coloration corresponding to the output voltage of the voltage limiting circuit 26. Since the voltage at the + input terminal of the operational amplifier IC10 is obtained by dividing the voltage at the + input terminal of the operational amplifier IC11 with the resistances R17 and R18, the transistors Tr1 and Tr2 are not turned on simultaneously. The ratio of resistance of the resistances R17 and R18 should preferably be 1:30 to 1:100.

Figure 8:
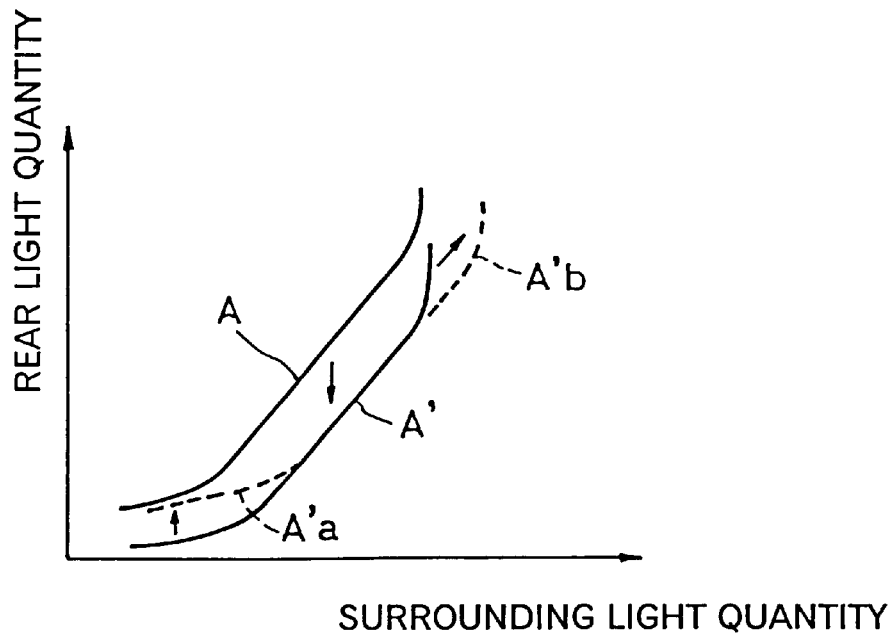
FIG. 8 is a graph illustrating a manner to shift the sensitivity curve laterally in parallel in the circuit of FIG. 7.

Lateral parallel shifting of the sensitivity curve in the circuit shown in FIG. 7 can be realized by combination of the above described vertical parallel shifting by the resistances R7 to R10 and adjustment of the resistances R1 to R4 of the oscillation circuit 20. This process will be described with reference to FIG. 8. It is assumed that an initial sensitivity characteristic is a curve designated by A. In a case where this characteristic is to be shifted laterally (to the right in the figure) in parallel, the resistances R7 to R10 are adjusted to shift the sensitivity characteristic downwardly in parallel to A'. Then, the resistances R1 and R3 of the oscillation circuit 20 are adjusted to lift the lower portion of the characteristic A' to A'a and the resistances R2 and R4 of the oscillation circuit 20 are adjusted to extend the upper portion of the characteristic A' to A'b. By these operations, a sensitivity characteristic A'a–A'–A'b which is equivalent to the initial sensitivity characteristic A shifted in parallel to the right is produced. Shifting of the initial sensitivity characteristic in parallel to the left can be realized by a reverse operation, i.e., by shifting the initial sensitivity characteristic A upwardly in parallel, lowering the lower portion of the characteristic A which has been shifted in parallel and shortening the upper portion thereof.

What is claimed is:

1. A device for driving an EC dimming mirror in which reflectivity is variably controlled by an EC element comprising:

surrounding light quantity detection means for detecting quantity of light surrounding a vehicle;

rear light quantity detection means for detecting quantity of light in the rear of the vehicle;

an oscillation circuit for generating an oscillation signal of an "H" level and an oscillation signal of an "L" level repeatedly and alternately, duration of one level of the oscillation signals being variably controlled in response to quantity of light detected by the surrounding light quantity detection means and the other level of the oscillation signals being variably controlled in response to quantity of light detected by the rear light quantity detection means;

a DC voltage output circuit for outputting DC voltage in accordance with duty factor of an oscillation output of the oscillation circuit;

a drive power source for driving the EC element; and an EC element drive circuit for adjusting polarity and level of drive voltage supplied from the drive power source in response to the level of the output from the DC voltage output circuit and supplying the adjusted drive voltage to the EC element, said oscillation circuit performing control, when the one level of the oscillation signals is set to drive the EC element in a color imparting direction and the other level of the oscillation signals is set to drive the EC element in a color fading direction, in such a manner that, when surrounding light quantity is larger, the duration of the one level is shorter and, when the surrounding light quantity is smaller, the duration of the one level is longer and that, when the rear light quantity is larger, the duration of the other level is shorter and, when the rear light quantity is smaller, the duration of the other level is longer, and said oscillation circuit performing control, when the one level of the oscillation signals is set to drive the EC element in a color fading direction and the other level of the oscillation signals is set to drive the EC element in a color imparting direction, in such a manner that, when the surrounding light quantity is larger, the duration of the one level is longer and, when the surrounding light quantity is smaller, the duration of the one level is shorter and that, when the rear light quantity is larger, the duration of the other level is longer and, when the rear light quantity is smaller, the duration of the other level is shorter.

2. A device for driving an EC dimming mirror as defined in claim 1 which further comprises a level shift circuit for shifting the level of the output voltage of the DC voltage output circuit, said EC element drive circuit being controlled in response to the level-shifted voltage.

3. A device for driving an EC dimming mirror as defined in claim 1 further comprising a voltage-dividing circuit for dividing the output voltage of the DC voltage output circuit, said EC element drive circuit being controlled in response to the divided voltage.

4. A device for driving an EC dimming mirror as defined in claim 1 further comprising a voltage limiting circuit for controlling upper and lower limit values of the output voltage of the DC voltage output circuit, said EC element drive circuit being controlled in response to the voltage which has been limited in the upper and lower limit values.

5. A device for driving an EC dimming mirror as defined in claim 1 wherein said DC voltage output circuit is made of an integration circuit.

* * * * *